United States Patent
Hart

[19]

[11] Patent Number: 6,029,437
[45] Date of Patent: Feb. 29, 2000

[54] CABLE/HOSE HANDLING CHAIN

[75] Inventor: Anthony John Hart, Arnold, United Kingdom

[73] Assignee: Mansign Mining Equipment Limited, United Kingdom

[21] Appl. No.: 09/193,967

[22] Filed: Nov. 18, 1998

[30] Foreign Application Priority Data

Nov. 19, 1997 [GB] United Kingdom .................... 9724402

[51] Int. Cl.⁷ ....................................................... B21L 3/02
[52] U.S. Cl. ....................................... 59/78; 248/49; 248/51
[58] Field of Search ....................... 59/78.1, 900; 248/48, 248/49, 51

[56] References Cited

U.S. PATENT DOCUMENTS

| Re. 35,579 | 8/1997 | Moritz et al. | 59/78.1 |
| 4,104,871 | 8/1978 | Moritz | 59/78.1 |
| 5,048,283 | 9/1991 | Moritz et al. | 59/78.1 |
| 5,711,144 | 1/1998 | Pea | 59/78.1 |
| 5,768,882 | 6/1998 | Weber et al. | 59/78.1 |

FOREIGN PATENT DOCUMENTS

| 2728442 | 1/1978 | Germany | 59/78.1 |
| 3814995 | 7/1989 | Germany | 59/78.1 |
| 3812559 | 11/1989 | Germany | 59/78.1 |

*Primary Examiner*—David Jones
*Attorney, Agent, or Firm*—Jones & Askew

[57] ABSTRACT

A chain link for a cable/hose handling chain, the chain link including a body defined by a pair of opposed sidewalls, a top wall and a bottom wall which together define a closed compartment for housing cables/hoses, each of the sidewalls being provided with pivotal formations to enable the chain link to be pivotally connected to a similar link to form a chain, at least one of the sidewalls being detachably attached to one end of the top and bottom walls to provide access to the compartment for insertion and removal of cable/hoses.

10 Claims, 7 Drawing Sheets

CABLE/HOSE HANDLING CHAIN

The present invention relates to a cable/hose handling chain and to a chain link therefor.

In particular the present invention relates to a cable/hose handling chain and chain link therefor which is suitable for use in handling cables/hoses used in deep coal mining operations, for example as used for supplying electrical power or hydraulic fluid to coal winning equipment.

In such operations it is desirable for the handling chain to be reliable in use whilst operating in a harsh environment, and easy to disassemble to enable cables/hoses to be inserted or removed from the chain often in very restricted areas of space. It is also desirable for the chain to be of minimum width so as not to occupy a substantially greater amount of space than that occupied by the cables/hoses being handled.

It is known to provide a type of cable/hose handling chain referred to as side pull chains which are composed of open sided chain links. Typical examples of side pull chain links are disclosed in our earlier UK patent 1441362. With side pull chains the cable/hose is retained within the chain by removable clips. Since each chain link is open sided they are susceptible to snagging whilst being dragged and if snagging occurs there is a danger that the cables/hoses become damaged by the clips digging into them and/or by the cables/hoses being pulled out of the handling chain. In either case it is usually then necessary to replace the cables/hoses and this is an expensive exercise both in terms of replacement cost and downtime for the affected operation.

Side pull handling chains have the advantage of meeting the minimum width and ease of insertion/removal of cables/hoses requirements and so have remained popular in mining environments despite the problems associated with snagging.

A general aim of the present invention is to provide a cable/hose handling chain which retain the advantages of using side pull chains whilst avoiding the snagging problem associated with side pull handling chains.

According to one aspect of the present invention there is provided a chain link for a cable/hose handling chain, the chain link including a body defined by a pair of opposed sidewalls, a top wall and a bottom wall which are connected together to define a closed compartment for housing cables/hoses, each of the sidewalls being provided with pivotal formations to enable the chain link to be pivotally connected to a similar link to form a chain, one of the sidewalls being detachably attached to one end of the top and bottom walls to enable removal of said one sidewall to provide access to the compartment for insertion and removal of cable/hoses, the connection between the top, bottom and remaining sidewall being such as to maintain integrity of said compartment after removal of said one sidewall.

Preferably both sidewalls are identical in shape and are each defined by a first component. Preferably both the top wall and bottom wall are identical in shape and are each defined by a second component. Accordingly in a preferred embodiment, the body is defined by a pair of said first components spaced apart from one another and secured to a pair of spaced apart second components.

Various aspects of the present invention are hereinafter described with reference to the accompanying drawings in which.

Figure 1:
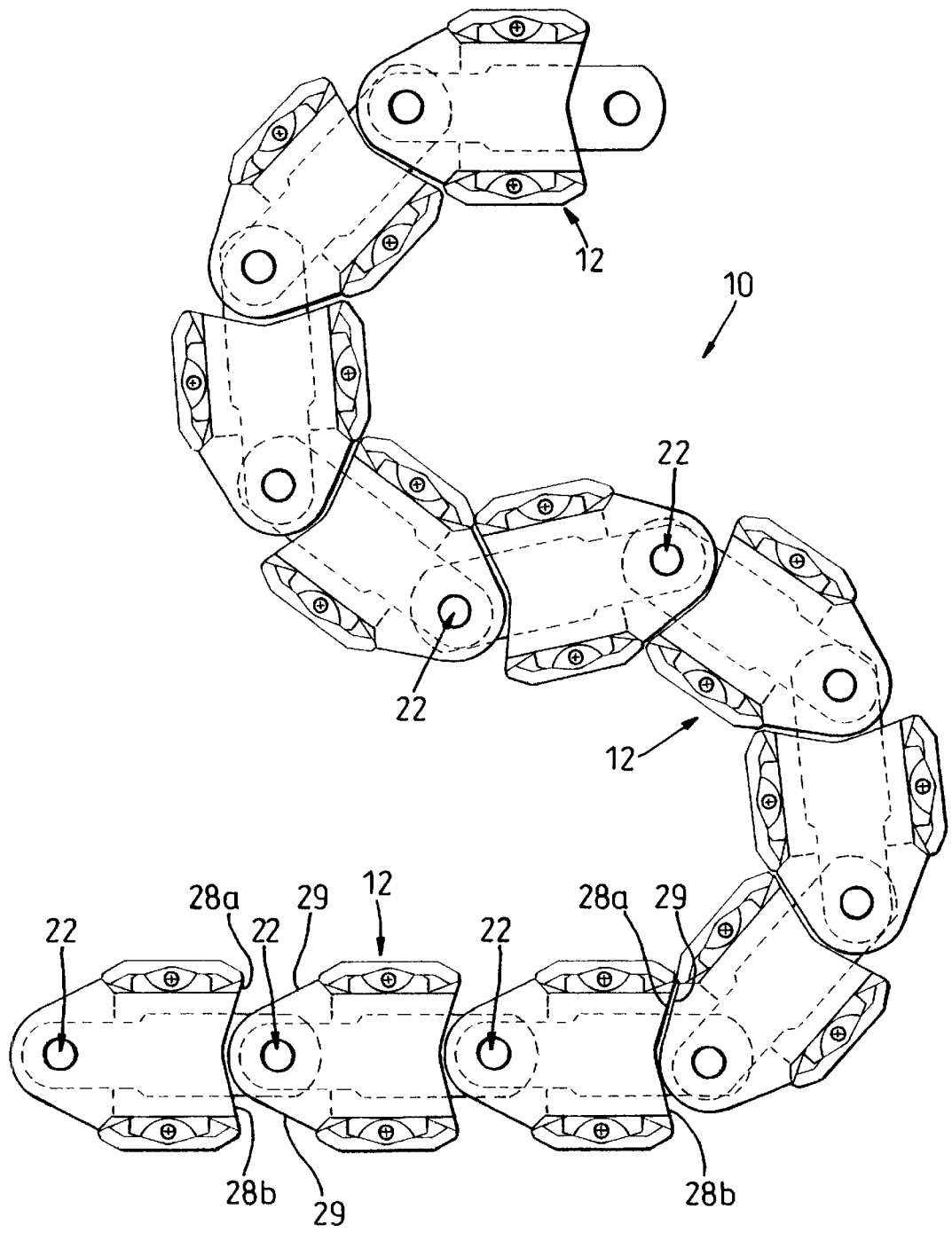
FIG. 1 is a side view of a chain according to a first embodiment of the present invention.

Referring initially to FIG. 1 there is shown a cable/hose handling chain 10 which comprises a plurality of chain links 12. Each chain link 12 is pivotally connected to a neighbouring chain link 12 so as to enable the chain to articulate. As seen in FIG. 1 the chain 10 has been articulated to form a double loop.

Figure 2:
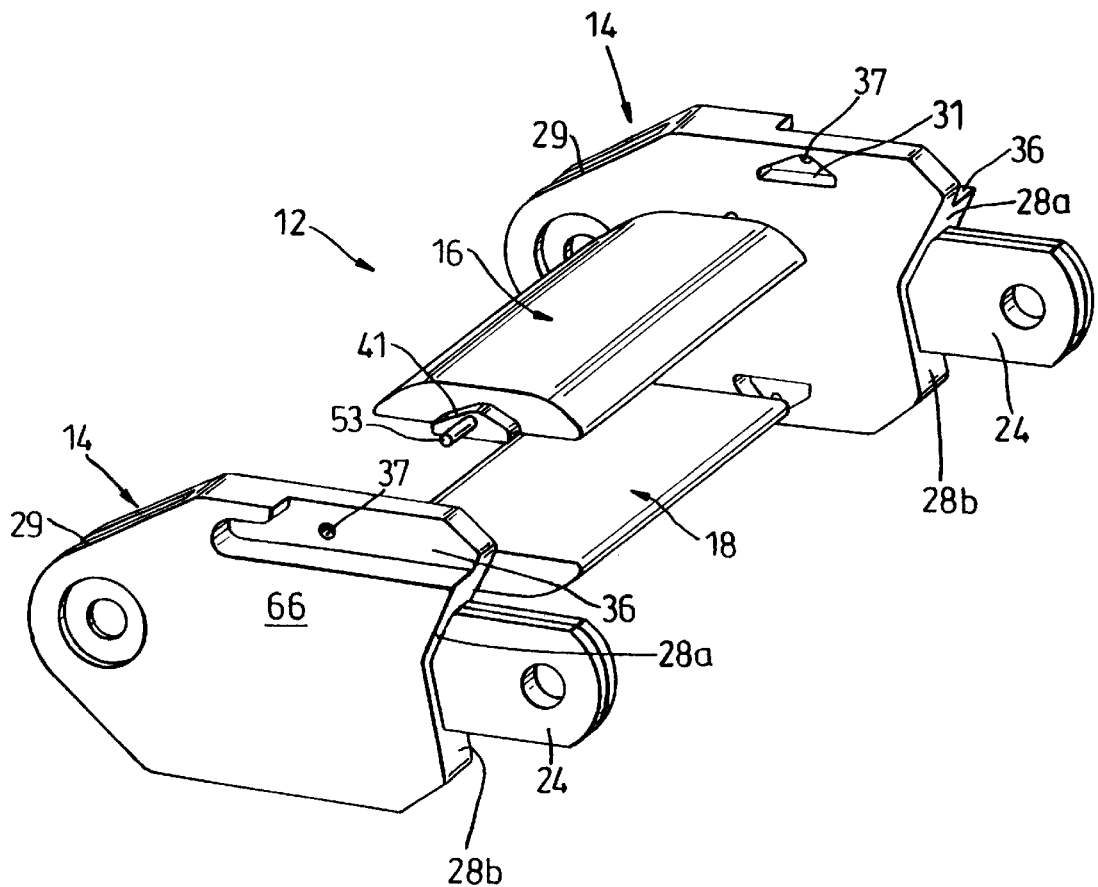
FIG. 2 is an exploded perspective view of a chain link for forming the chain of FIG. 1.
Figure 3:
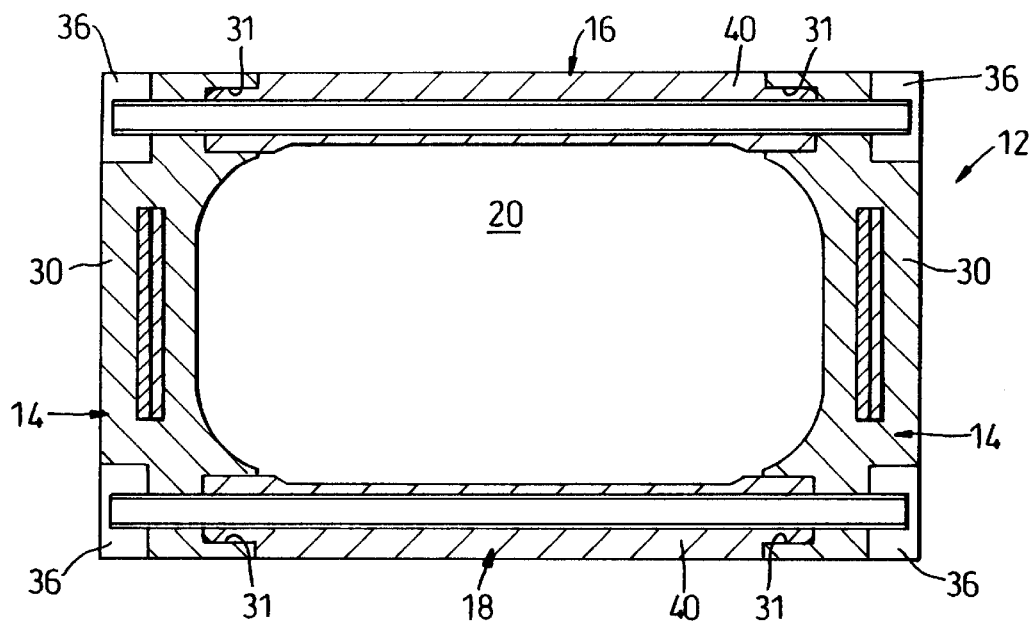
FIG. 3 is an end view of the chain link shown in FIG. 2 when assembled.
Figure 4:
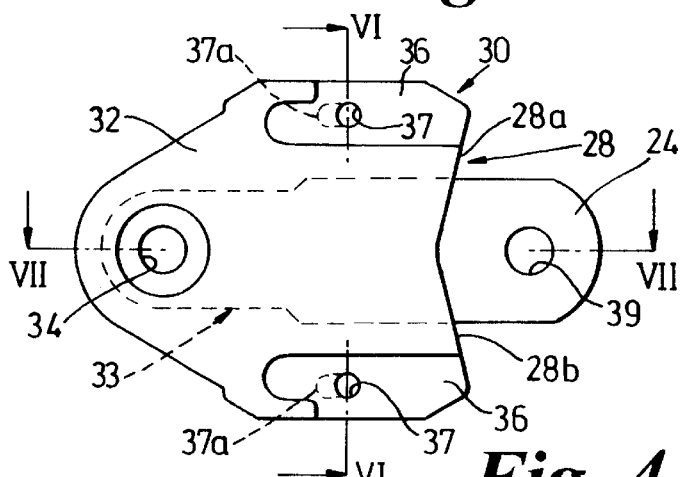
FIG. 4 is an outside side view of a first component for defining one of the sidewalls of the chain link shown in FIG. 3.
Figure 6:
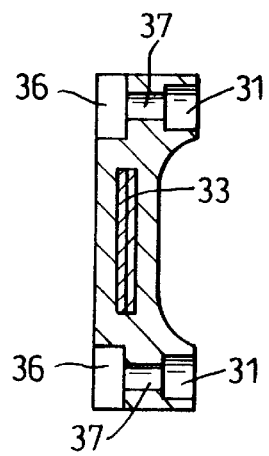
FIG. 6 is a sectional view taken along line VI—VI in FIG. 4.
Figure 5:
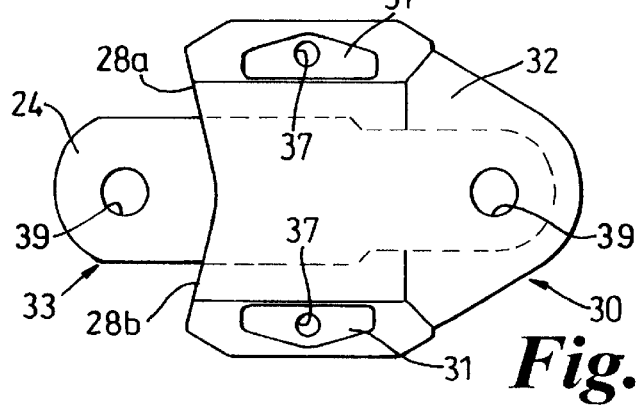
FIG. 5 is an inside side view of the first component shown in FIG. 4.
Figure 7:
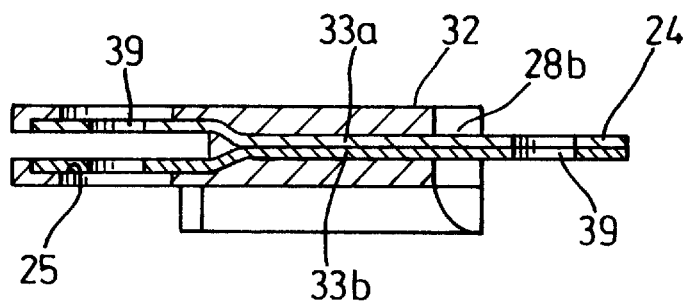
FIG. 7 is a sectional view taken along line VII—VII in FIG. 4.
Figure 8:
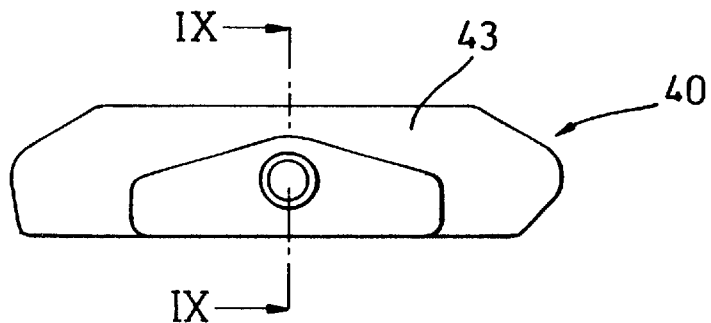
FIG. 8 is an and view of a second component for defining the top and bottom walls of the chain link shown in FIG. 3.
Figure 9:
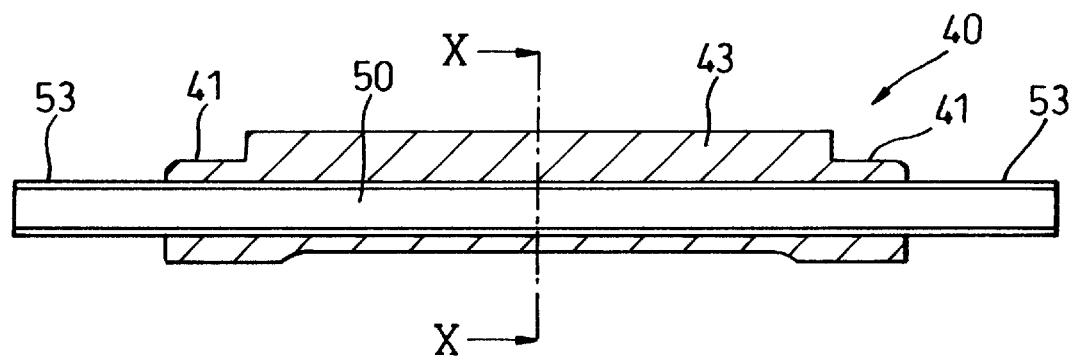
FIG. 9 is a sectional view taken along line IX—IX in FIG. 8.
Figure 10:
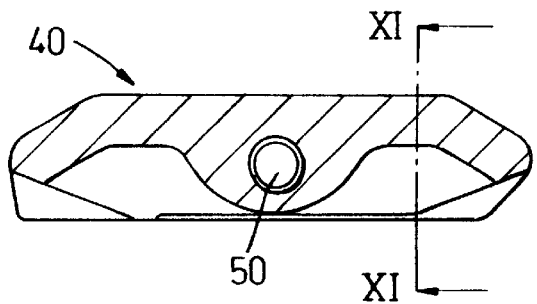
FIG. 10 is a sectional view taken along line X—X in FIG. 9.
Figure 11:
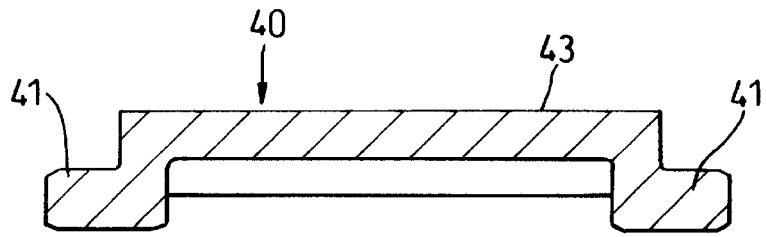
FIG. 11 is a sectional view taken along line XI—XI in FIG. 10.

As seen in FIGS. 2 and 3, each chain link 12 has a body which is defined by a pair of sidewalls 14, a top wall 16 and a bottom wall 18. These walls collectively define a compartment 20 through which cables/hoses may pass longitudinally along the chain 10. Since walls 14,16,18 continuously bound the compartment, i.e. these walls define a closed compartment, the cables/hoses contained within the compartment and extending longitudinally of the chain are held captive within the body of each chain link.

Each sidewall 14 is provided with pivotal formations 22 at each end to enable neighboring chain links to be pivotally connected to one another. Accordingly each chain link is pivotally attached to each neighbouring chain link at two co-axially aligned locations which are spaced apart in the widthwise direction of the chain.

Peferably as seen in FIGS. 2 and 3 both sidewalls of each chain link 12 are identical in shape and so each is constituted by the same component, referred to as the first component 30. The first component is illustrated in greater detail in FIGS. 4 to 7. Also as seen in FIGS. 2 and 3 the top wall 16 and bottom wall 18 are preferably identical in shape and so each is constituted by the same component, referred to as the second component 40. The second component 40 is illustrated in greater detail in FIGS. 8 to 11.

The first component 30 preferably comprises a plastics body 32 having a metal insert 33 embedded therein. The body 32 is preferably injection moulded from a suitable plastics material such as Nylon (RTM). On the inner face of the body 32 there is provided a pair of recesses 31 and on the outer face of the body there is provided a pair of recesses 36. The recesses 31 and 36 are located in the same upper and lower regions of the body 32 and a through bore 37 is provided which communicates between neighbouring recesses 31,36.

The metal insert 33 includes apertures 39 for forming the pivotal connections 22 between the chain links 12. As more clearly seen in FIG. 7, the metal insert 33 is formed of two layers 33a,33b which at one end reside in face to face contact to define a mate pivotal connection 24 and which at the opposite end reside spaced apart to define a female pivotal connection 25. The layers 33a,33b are preferably fixedly secured together by for example riveting or welding.

Figure 12:
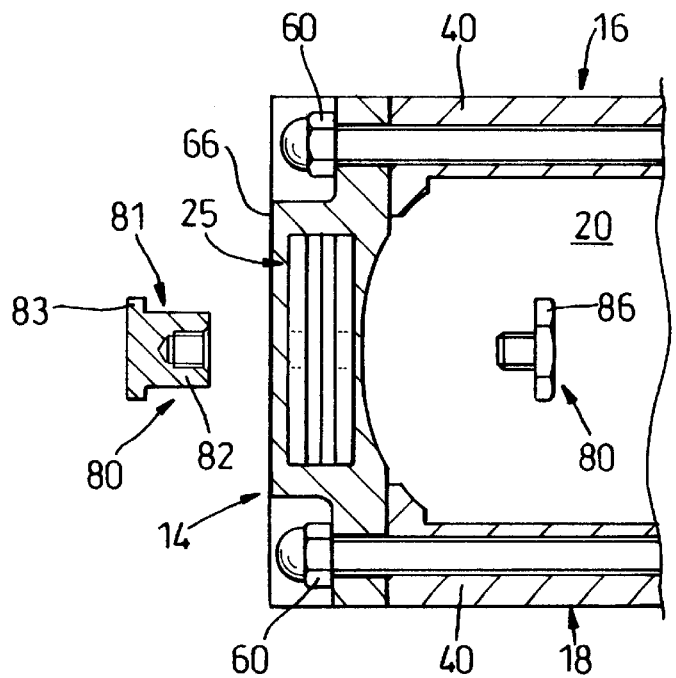
FIG. 12 is an enlarged part end view similar to FIG. 3.

As illustrated in FIG. 12, the mate and female pivotal connections 24, 25 are preferably pivotally connected by a pivot 80 which comprises a pivot body 81 having a shank portion 82 and a pair of axially spaced shoulders 83, 86. In use, the shank portion 82 is received within aligned apertures 39 in the male and female connections 24, 25. Shoulder 86 is threadedly received in the shank portion 82 so as to be removable.

The shoulders 83 and 86 co-operate to prevent axial withdrawal of the shank portion 82 from aligned apertures 39. Preferably the inner distance between shoulders 83 and 86 is greater than the outer distance between the outer faces of female connection 25 so that the shank portion 82 is freely rotatable wit the aligned apertures 39.

Figures 14, 15:
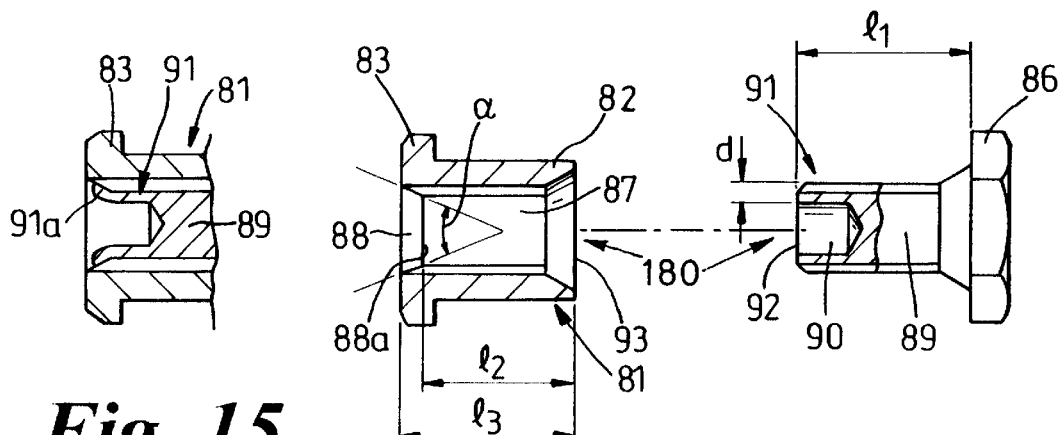
FIG. 14 is an exploded axial sectional view of a modified pivot to shown in FIG. 12.
FIG. 15 is a part sectional view of the pivot of FIG. 14 shown in an assembled condition.
Figure 16:
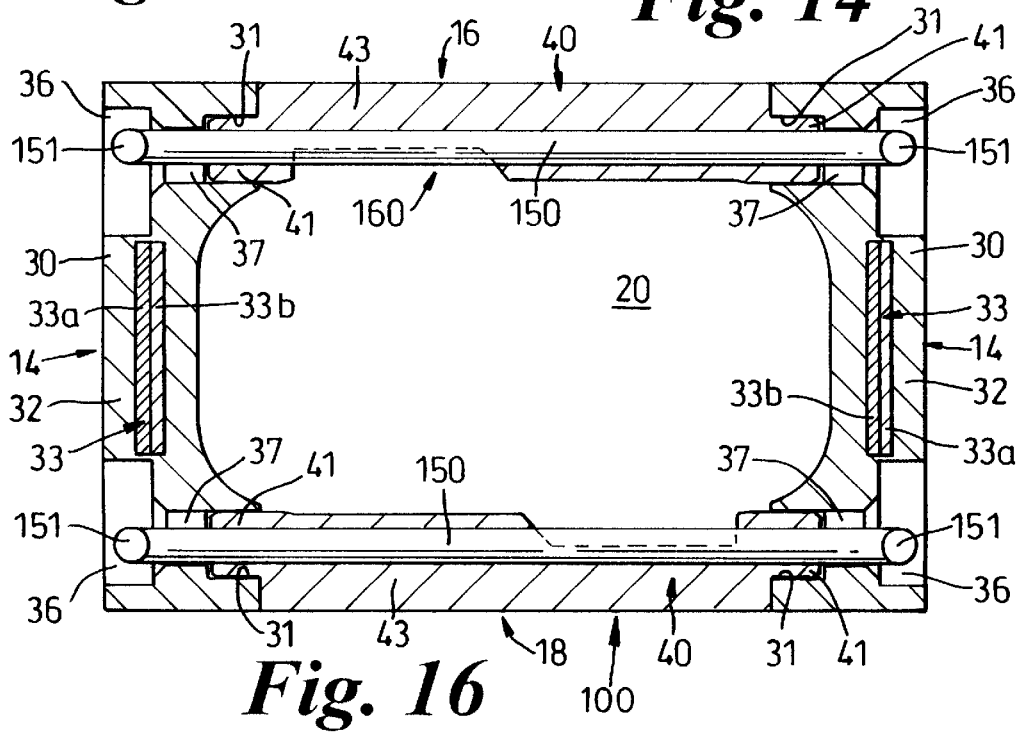
FIG. 16 is an end view similar to FIG. 3 of a second embodiment according to the present invention.
Figure 17:
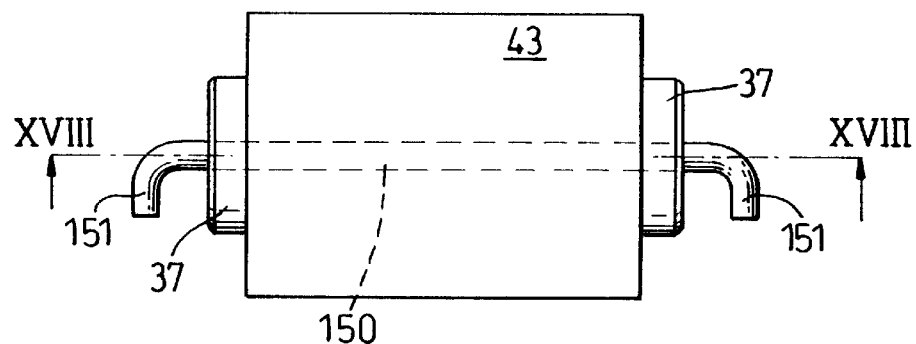
FIG. 17 is a plan view of the second component shown in FIG. 16.
Figure 18:
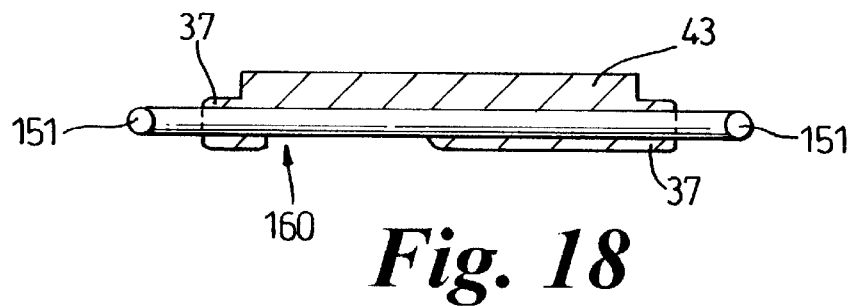
FIG. 18 is a sectional view taken along line XVIII—XVIII in FIG. 17.
Figure 19:
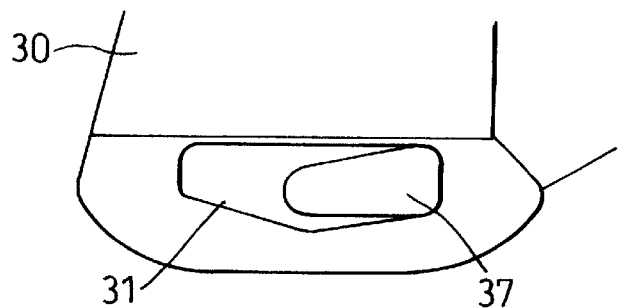
FIG. 19 is a part inside view of the lower end of the first component shown in FIG. 16.

The pivot 80 may be modified in order to resist separation during use. A preferred modified pivot 180 is illustrated in FIGS. 14 and 15 wherein parts similar to those in FIG. 12 have been designated by the same reference numerals.

In pivot 180 the shank portion 82 includes an integrally screw threaded screw bore 87 having an externally located frusto conical mouth 88.

The shoulder 86 is mounted in an externally screw threaded shaft 89 which on assembly is received within the bore 87.

The end of shaft 89 opposite to shoulder 86 is provided with a blind bore 90 which serves to define a tubular end portion 91 having a wall thickness d.

The length $l_1$ of the shaft 89 between shoulder 86 and its terminal end face 92 is chosen to be greater than the length $l_2$ between the inner end 88a of the frusto conical mouth 88 and the terminal end face 93 of the shank portion 82.

Accordingly, whilst the shaft 89 is fully inserted into bore 87 with end face 93 in abutment with shoulder 86, an end portion 91a of the tubular end portion 91 projects outwardly beyond the inner end 88a of the frusto conical mouth 88.

Using a suitable swaging tool, e.g. a punch, it is possible to radially outwardly deform end portion 91a so that it engages with the inner face of the frusto conical mouth 88; this is illustrated in FIG. 15. The outwardly deformed end portion 91a acts to resist unscrewing of the shaft 89 from the bore 87. The angle α of the frusto conical mouth is preferably chosen such that inward deformation of the deformed end portion 91a may be achieved in order to enable an operative to separate the shank portion 82 and shaft 89 for disassembly of the chain.

The angle α is preferably chosen to be about 45°.

Due to the inward deformation of the deformed end portion 91a, it will be appreciated that end portion 91a will frictionally engage the screw thread of bore 87 and so provide a resistance to unscrewing along the entire length of bore 87.

This resistance to unscrewing along the length of bore 87 is advantageous in that should a shaft 89 begin to unscrew during use of the chain 10, its complete separation from the shank portion 81 will be delayed by the resistance to rotation of the shaft 89.

This provides the opportunity for an operative to see that separation using pivot 180 is occurring before complete separation (and failure of the chain 10) occurs by seeing that end portion 91a is located within the bore 87 and not mouth 88.

Preferably the length $l_1$ of shaft 89 is less than $l_3$ (the distance between end 93 and the external face 83a of shoulder 83) so that end portion 91a does not project externally beyond the shoulder 83 in use.

Preferably the male connection 24 is exposed and projects beyond the end wall 28 of the body 32, the end wall 28 having two end wall portions 28a,28b inclined to one another. In use, and as seen in FIG. 1, these end wall portions 28a,28b co-operate with the opposite end wall 29 of the body of the neighbouring chain link 12 to define a stop for limiting articulation between adjacent chain links 12.

The second component 40 preferably comprises a plastics body 43 having connection projections 41 at opposite ends which are integrally formed with the remainder of the body 43. The body 43 is preferably an injection moulding which is preferably moulded from the same plastics material as used for the first component 30. A screw threaded bar 50 is preferably embedded within the body 43 to extend longitudinally through the body 43 and have end portions 53 which project beyond the projections 41. In the preferred embodiment, each chain link 12 is fabricated from a pair of the first components 30 which are secured side by side to opposed ends of a pair of the second components 40. Correct positioning of the first and second components 30,40 relative to one another is achieved by a respective projection 41 being located within a corresponding recess 31 formed on the inside face of the first component 30. The shape and dimensions of each projection 41 and corresponding recess 31 are substantially the same so that there is minimal play between the projection 41 and recess 31 when the projection 41 is received therein. This co-operation between the projection 41 and corresponding recess 31 restrains the top and bottom wall 16,18 from twisting about their respective longitudinal axis and also helps to stiffen the connection between the ends of the second components 40 defining the top and bottom walls and each first component 30 and thereby resist collapse of the chain link 12.

Figure 13:
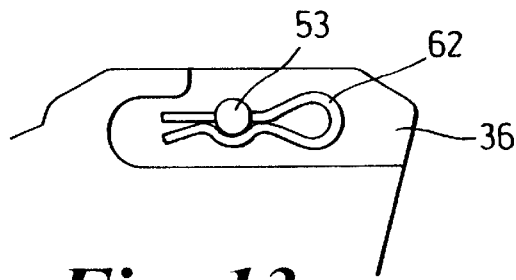
FIG. 13 is an enlarged part side view similar to FIG. 4.

When each projection 41 is inserted into the corresponding recess 31, the corresponding end portion 53 of the bar 50 extends through the bore 37 to project into the recess 36 located on the outside face of the component 30. A nut 60 (FIG. 12) or removable clip 62, such as a Cotter pin (FIG. 13) is attached to the end of the end portion 53 which projects into the recess 36 so as to prevent removal of the projection 41 from recess 31. The recess 36 is preferably designed to be sufficiently deep such that the nut 60 or end of the end portion 53 lies below the level of the outer surface 66 of the component body 32 and so protects the nut 60 and end portion 53 from snagging.

It is envisaged that in a given length of chain selected chain links are assembled using nuts 60, e.g. every third link in the chain, and that the intervening chain links 12 are assembled using clips 62. Use of the clips 62 facilitates disassembly for insertion/removal of cables/hoses whilst the use of nuts 60 helps maintain rigidity of the chain links.

It is envisaged that the threaded bar 50 may be threaded only at its outer ends although it is preferred that it is threaded along its entire length as this improves integrity with the plastics body 43.

Preferably a single bar 50 is provided which extends continuously along the full length of the component 40. This provides tensile strength along the bar 50 only and isolates the body 43 from tensile loadings. However it is envisaged that the end portions 53 may be separate components which are independent of one another.

Preferably to achieve securance of the top and bottom wall to a given sidewall, only a single end portion 53 is used. However, it will be appreciated that two or more end portions 53 may be used if desired.

Preferably a single connection projection 41 is provided at each end of the second component body 40 for positional location of the first and second components and for providing strength to the connection. It will be appreciated that two or more projections 41 may be provided at each end of the component body 40 for the same purpose, the first component 30 being provided with the appropriate number of corresponding recesses 31.

It will also be appreciated that projections 41 may be provided on the first component 30 and the corresponding recesses 31 be provided on the second component 40.

As an alternative, as illustrated in FIG. 12, it is envisaged that cooperating projections 41, and recesses 31 may be omitted.

Preferably the bore 37 has a diameter which is substantially the same as the outer diameter of the end portion 53 received therein. In this way, location of the end portion 53 helps to provide rigidity and support between the connected first and second components 30, 40.

To insert/remove cables/hoses from a chain, all that is necessary is to remove one side of the chain. This is achieved by removing the nuts 60 and spring clips 62 along one side of the chain to thereby enable the pivotally connected first components making up that side to be removed without breaking their pivotal interconnection i.e. it is not necessary to remove the pivots 80. The remainder of the chain is now open sided to permit removal/insertion of cables/hoses in a manner similar to that practiced with the side pull type of chain. Due to the interconnection between the remaining sidewall and the top and bottom walls sufficient rigidity remains to permit the cable/hoses to be inserted/removed.

In order to facilitate assembly/disassembly of the pivotally connected first components 30 making up one side of the chain 10 to/from the remainder of the chain it is envisaged that the bore 37 may be elongated to form a slot 37a (shown in broken lines in FIG. 4); the slot 37a preferably having a width the same as bore 37 and extending longitudinally from the same portion as bore 37 toward the female connection end of body 32.

A farther embodiment 100 is illustrated in FIGS. 16 to 20 in which parts similar to those in embodiment 10 have been designated by the same reference numerals.

In embodiment 100, each chain link is constructed from first and second components 30, 40 in a similar manner to embodiment 10; however the manner in which components 30, 40 are releasably held together is different.

In this respect, bar 50 is replaced by a shaft 150 which at each end has cranked portions which define radially projecting stop arms 151.

The openings 37 in components 30 are generally slot shaped (as seen more clearly in FIG. 19) and extend toward the leading or front end of the chain link.

In use, on assembly of a link, arc 151 is passed through opening 37 and the shaft 150 is then rotated (by gripping one of the arms 151 with a suitable tool) to move the arms 151 such that they point toward the rearward or back end of the chain link. This moves each arm 151 out of registry with its corresponding opening 37 and so prevents separation of components 30, 40 from one another.

Preferably, after assembly of each link, the openings 37 on one side of the chain link are blanked off by insertion of a suitable insert (not shown). This enables the shaft 150 to be rotated to move the stop arms into registry with openings 37 and permit removal of one component 30 only for insertion/removal of cables whilst maintaining integrity of the remainder of the chain link. Preferably, in use the arms 151 are maintained out of registry with openings 37 by virtue of frictional resistance resisting rotation of shaft 150 and/or the forwardly located angular position of the slot shaped opening relative to the axis of shaft 150.

In order to vary the frictional resistance of shaft 150 within body 43 during manufacture, a recess 160 is preferably provided which is formed in the body 43 to expose a predetermined axial length of shaft 150. By varying the exposed axial length of shaft 150 it is possible to increase/decrease its resistance to rotation.

Recess 160 also provides an added advantage in providing more internal height within the chain link for accommodating larger cables/hoses.

It is envisaged that a chain utilising chain links according to the present invention may be supplied to an installation in discrete unit lengths of say 1 or 2 metres. Thus, on site, it is only necessary for links at the end of each unit length to be joined together.

Preferably, in order to facilitate securance of the unit lengths of chains, the pivot connection for connecting chain links are preferably formed such that access for inserting and removing the pivot is from the outside of the main link only.

Figure 20:
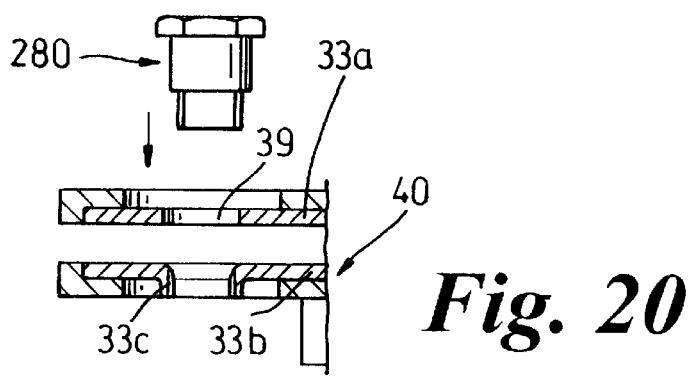
FIG. 20 is a part sectional view, similar to FIG. 7, showing an alternative pivotal connection.

A suitable pivot connection is illustrated in FIG. 20. For the terminal connecting chain link, the pivot hole 39 formed in plate 33b has been adapted to screw threadingly receive a pivot pin 280. In this regard, plate 33b has been deformed to define a tubular portion 33c which is then provided with an internal screw thread to receive the screw thread of pivot pin 280.

Advantageously, the plastics material used to mould component 30 forming the connecting link may be of a different colour to that used for the other links. In this way, an operative can readily identify the connecting links in a fully assembled chain for maintenance purposes.

It will be appreciated that the chain of the present invention totally encloses the cable/hoses wit the body of each chain link and so avoids problems associated with snagging as caused with conventional open sided chain links of the side pull type. In addition since each chain link of the present invention is pivotally connected at two locations at each end to each neighbouring chain link, the pulling forces applied to the chain when being dragged are equally balanced and shared. This reduces the loadings on each pivotal connection compared to conventional chains made up of chain links which are pivotally connected at one location and so reduces wear of the pivotal connection.

What is claimed is:

1. A chain link for a cable/hose handling chain, the chain link including a body defined by a pair of opposed sidewalls, a top wall and a bottom wall which are connected together to define a closed compartment for housing cables/hoses, each of the sidewalls being provided with pivotal formations to enable the chain link to be pivotally connected to a similar link to form a chain, one of the sidewalls being detachably attached to one end of the top and bottom walls to enable removal of said one sidewall to provide access to the compartment for insertion and removal of cable/hoses, the connection between the top, bottom and remaining sidewall being such as to maintain integrity of said compartment after removal of said one sidewall, said one sidewall including upper and lower connection formations in the form of recesses or projections located on an inner side face, the top and bottom walls having at their ends projecting cooperating connection formations in the form of projections or recesses engaged with respective connection formations formed on the said sidewall, wherein said one sidewall includes an upper bore extending through the sidewall from said upper connection formation to an outer side face of said sidewall, and a lower bore extending through the sidewall from said lower connection formation to the outer side face of said sidewall, the top and bottom walls each including attachment means passing through said upper and lower bore respectively, the attachment means including fixing means for maintaining engagement of the cooperating connection means, the top and bottom walls each comprising a body molded from a plastics material, and the attachment means for each of the top and bottom walls being in the form of at least one metal rod extending through said body.

2. A chain link according to claim 4 wherein the fixing means comprises a screw threaded nut detachably mounted on the rod.

3. A chain link according to claim 1 wherein the fixing means comprises a removable pin passing through the rod.

4. A chain link according to claim 1 wherein said metal rod extends throughout the length of the top or bottom wall and projects beyond each end of said wall, the rod being provided at each end with a radially projecting stop arm and being rotatable received in the body of said top or bottom wall.

5. A chain link according to claim 4 wherein said body of the top or bottom wall includes a recess which exposes a predetermined length of said rod in order to provide a desired resistance to rotation of the rod.

6. A chain link according to claim 3 wherein said one sidewall is provided with an upper and lower outer recess located on its outer side face, said upper outer recess communicating with said upper bore and accommodating the fixing means associated with the top wall, said lower outer recess communicating with said lower bore and accommodating the fixing means associated with the bottom wall, said upper and lower outer recesses each being of a sufficient depth to enable said fixing means to lie below the outer side face of said sidewall.

7. A chain link according to claim 1 wherein the top and bottom wall are identical.

8. A chain link according to claim 1 wherein both sidewalls are identical.

9. A chain comprising a plurality of chain links according to claim 1 pivotally connected together by pivot pins connecting sidewalls of adjacent links to one another.

10. A chain according to claim 9 wherein the pivot pin connecting each sidewall of adjacent links includes a pivot body having a shank portion and first and second axially spaced shoulders, said first shoulder being mounted on a shaft which is screw threadedly received within a bore axially extending through said shank portion, said bore having a frusto conical mouth adjacent to said second shoulder and the terminal end of said shaft being located in said mouth and being deformed outwardly to resist axial withdrawal of the shaft from aid bore.

* * * * *